(12) United States Patent
Tilley

(10) Patent No.: US 7,261,223 B2
(45) Date of Patent: Aug. 28, 2007

(54) SAW BLADE LUBRICATING APPARATUS

(76) Inventor: Robert W. Tilley, 21710 Moortown Cir., Katy, TX (US) 77450

( * ) Notice: Subject to any disclaimer, the term of this patent is extended or adjusted under 35 U.S.C. 154(b) by 701 days.

(21) Appl. No.: 10/756,911

(22) Filed: Jan. 15, 2004

(65) Prior Publication Data
US 2005/0155476 A1    Jul. 21, 2005

(51) Int. Cl.
*B26D 7/08*    (2006.01)
(52) U.S. Cl. .................. 222/330; 222/327; 222/333; 222/387; 83/169; 184/27.1; 184/99; 184/104.1
(58) Field of Classification Search ............... 222/330, 222/333, 325–327, 387; 184/27.1–27.4, 184/26, 37, 99, 104.1; 83/169–171
See application file for complete search history.

(56) References Cited
U.S. PATENT DOCUMENTS

| | | | | |
|---|---|---|---|---|
| 1,982,325 A | * | 11/1934 | Shepherd | ............... 184/109 |
| 2,037,349 A | * | 4/1936 | Svetlik | ............... 222/165 |
| 2,630,942 A | * | 3/1953 | Shaffer | ............... 141/19 |
| 2,895,650 A | * | 7/1959 | Mahon et al. | ............... 222/387 |
| 4,088,078 A | * | 5/1978 | Noble | ............... 104/26.2 |
| 5,054,582 A | | 10/1991 | Aracil | |
| 5,305,853 A | | 4/1994 | Ross et al. | |
| 5,839,355 A | | 11/1998 | Faulkner | |

* cited by examiner

*Primary Examiner*—J. Casimer Jacyna

(57) ABSTRACT

A saw blade lubricating apparatus has a barrel with an outlet at one end thereof, a drive cooperative with the barrel for extruding wax outwardly of the outlet of the barrel, a dispenser block connected by a conduit to the barrel and having a wax inlet and a wax outlet, and a valve positioned in or on the dispenser block. The valve is selectively movable between a first position allowing wax flow between the wax inlet and the wax outlet and a second position blocking wax flow between the wax inlet and the wax outlet. A saw blade can be positioned adjacent to the wax outlet of the dispenser block.

8 Claims, 5 Drawing Sheets

SAW BLADE LUBRICATING APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to devices for the lubricating of saw blades. More particularly, the present invention relates to devices for automatically dispensing solid or semisolid lubricating mediums at a desired location on a moving saw blade.

BACKGROUND OF THE INVENTION

Both circular saws and band saws are employed by the metal industry for continuously cutting or trimming aluminum and other nonferrous and ferrous metals. These saws operate at high speeds creating saw blade friction which both damages the blade and slows the cutting process. The operation of lubricating the blade or the metal to be cut helps to reduce the friction and increases the overall performance of the cutting operation.

Prior devices, such as a product known as "UNI-MIST" (™), have been developed which deliver an atomized liquid lubrication medium to a cutting apparatus, such as a saw. Other devices have been developed in the railroad industry for continuously applying lubricants in a stick form to railroad car wheel. Such a device is described in U.S. Pat. Nos. 5,305,853 and 5,054,582.

It is a common industry practice for a saw operator to apply lubricant to a running saw blade by rubbing the moving saw blade with a solid block of tallow. In the aluminum industry, a solid lubricant is the preferred medium for lubricating saw blades since liquid lubricants are unable to be localized in application. This results in saturating the shavings with the lubricating medium. Such saturated shavings interfere with the ability to recycle the aluminum shavings. The railroad car wheel lubricators are effective in applying a single stick or multiple sticks to a surface to be lubricated. However, saw blades must be lubricated on opposing sides evenly. Additionally, a continuous saw blade lubricator must be able to withstand the damaging effects of band saw blade breakage which can damage machinery in the path of a moving broken blade.

The present inventor is the owner of U.S. Pat. No. 5,839,335, issued on Nov. 24, 1998. This patent describes an apparatus for continuously lubricating operating circular and band saw blades with solid or semisolid lubricant. The lubricant contacts both sides of the blade by use of opposing lubricant tube ends. There is disclosed a single loading cylinder with automated lubricant feeding circuitry.

FIG. 1 illustrates of this prior art system. The system shown in FIG. 1 includes a lubricant canister 10, clamping blocks 30, and a control unit 50. The canister 10 is a reservoir for lubricant 15 to be delivered via tubing 20 to the clamping blocks 30. The clamping blocks 30 maintain the end of tubing 21 in close proximity with a saw blade 60 so that the lubricant 15 is deposited upon the rotating saw blade 60.

The canister 10 functions as a lubricant reservoir and is constructed cylindrically of a lightweight durable material, such as aluminum. A means for delivering the lubricant from the canister 10 to the saw blade 60 includes a "Y" connection 14, tubing 20 and clamping block 30. The "Y" connection 14 is fixedly secured to a central aperture of the canister 10. This aperture provides a passageway for lubricant 15 to exit the canister 10 and to be divided into two lubricant streams. Two separate pieces of plastic tubing 20 are connected to each leg of the "Y" connection 14 by a conventional tubing connection 16. The tubing connection 16 includes a compression fitting, a swage lock connection, a butt connection or some other suitable fitting. The tubing 20 is composed of plastic, such as polypropylene, polyethylene, polyvinylchloride, or other suitable commercial plastic. The plastic tubing 20 does not extrude and should have suitable flexibility to adapt the apparatus to saws with different dimensions. The end 21 of each piece of tubing 20 is in close proximity to saw blade 60. This end 21 is held in a proper position by the clamping block 30. The clamping blocks 30 are blocks that are used to secure the ends of the tubing 21 and further to securely position the ends 21 in close proximity to the saw blade 60. The tubing ends 21 should be placed close enough to the moving saw blade 60 so that the exiting lubricant 15 will be placed upon the moving saw blade. The ends of the tubing can act as sacrificial tubing and can be cut by the saw blade if they approach too closely to the saw blade. A mounting plate 40 serves to securely position the blocks 30 on each side of the saw blade 60.

FIG. 1 also discloses a means for displacing the lubricant from the canister 10. This includes a canister cap 9, a piston located within the canister 10 a threaded ram 7, and a stepper motor. The canister cap 9 is positioned upon the top end of the canister 10 and is threadedly secured to the canister 10. The canister cap 9 has a cavity that includes the stepper motor therein. The threaded rim 7 is a continuously threaded rod of metal with a means for securing the piston on one end. The stepper motor is controlled by the controller 50. The controller 50 has a suitable power source. The controller 50 has a data entry means, such as a keyboard, which allows the user to enter a desired stepper motor speed. A heating means 70 is wrapped around the conical section of the canister 10. The heating means 70 is a conventional electrical resistance heater which is wired to the controller 50 through wiring 71. The controller 50 controls the temperature of the conical area so that the lubricant 15 in the canister 10 will be more fluid and more easily pumped into the tubing 20. The controller 50 is attached to the canister 10 by bands 56 which wrap around the canister 10.

It is an object of the present invention to provide a saw blade lubricating apparatus which deposits solid lubricant on a saw blade.

It is another object of the present invention to provide a saw blade lubricating apparatus which effectively places the solid lubricant on both sides of the saw blade and into the gullets of the blade.

It is a further object of the present invention to provide a saw blade lubricating apparatus which is relatively easy to load with solid lubricant.

It is a further object of the present invention to provide a saw blade lubricating apparatus which avoids Y-shaped adapters, heaters and stepper motors.

It is another object of the present invention to provide a saw blade lubricating apparatus in which the drive piston can be easily retracted in a fast and efficient manner.

These and other objects and advantages of the present invention will become apparent from a reading of the attached specification and appended claims.

BRIEF SUMMARY OF THE INVENTION

The present invention is a saw blade lubricating apparatus comprising a barrel having an outlet at one end thereof, a drive means cooperative with the barrel for extruding wax outwardly of the outlet of the barrel, a dispenser block interconnected to the barrel and having a wax inlet and a wax outlet, and a valve positioned on or in the dispenser block. The valve is selectively movable between a first position allowing wax flow between the wax inlet and the wax outlet and a second position blocking wax flow between the wax inlet and the wax outlet.

In the present invention, the barrel has the outlet extending through a fitting applied to one end of the barrel. This fitting is releasably retained by a quick disconnect coupling at one end of the barrel. The drive means has a piston extending into the barrel. This drive means serves forcibly push the piston through an interior of the barrel. The drive means includes a motor positioned adjacent to the barrel and a gear box drivingly connected to the piston. The motor is drivingly connected to the gear box. In the preferred embodiment of the present invention, the motor is a one-quarter horsepower motor. The gear box has an 80,000:1 reduction. The gear box is suitably reversible so as to move the piston backwardly in the barrel at a rate that is faster than a rate that the piston move forwardly in the barrel.

In the present invention, a wax stick is received within the barrel. The drive means acts on the wax stick so as to extrude the wax from the wax stick outwardly of the outlet of the barrel. A tube is provided which has the wax stick therein. This tube has an outer diameter that is less than the inner diameter of the barrel. A separate piston is positioned in one end of the tube. The drive means acts on this piston so as to push on the piston so as to extrude the wax outwardly of the outlet.

In the present invention, a conduit is affixed at one end to the outlet of the barrel and connected at an opposite end to the dispenser block. The dispenser block has a channel extending therein. The wax outlet includes a first wax outlet in communication with the channel and a second wax outlet in communication with the channel. The first wax outlet faces the second wax outlet in spaced relationship thereto. The valve is positioned within this channel. The valve has a crank arm extending therefrom. A first solenoid is connected to the crank arm so as to selectively move the valve between the first and second positions. A second solenoid is connected on an opposite side of the crank arm from the first solenoid. One of the first and second solenoids serves to move the crank arm in one direction. The other of the solenoids serves to move the crank arm in an opposite direction. The dispenser block has a manifold area connected to the channel. This manifold area is in communication with each of the first and second wax outlets. The first and second wax outlets are positioned on opposite sides of a saw blade extending therebetween.

DETAILED DESCRIPTION OF THE INVENTION

Figure 2:
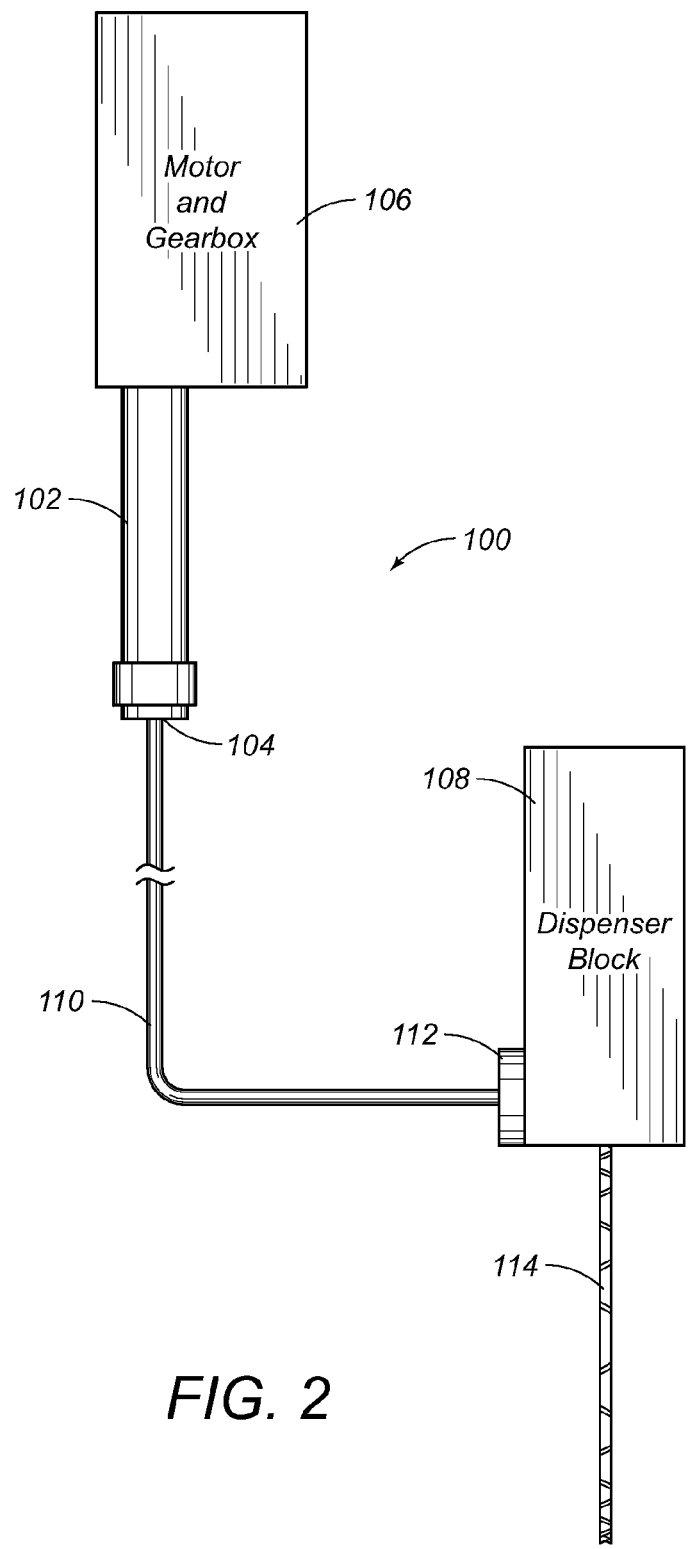
FIG. 2 is a diagrammatic illustration of the saw blade lubricating apparatus in accordance with the present invention.

Referring to FIG. 2, there is shown the saw blade lubricating apparatus 100 in accordance with the teachings of the preferred embodiment of the present invention. The saw blade lubricating apparatus 100 includes a barrel 102 having an outlet 104 at one end thereof. A drive means 106 is connected to the barrel 102 and is cooperative therewith so as to extrude wax outwardly of the outlet 104 of the barrel 102. A dispenser block 108 is connected by conduit 110 to the outlet 104 of barrel 102. As will be described hereinafter, the dispenser block 108 will have a wax inlet and a wax outlet. A valve 112 is positioned on the dispenser block 108. The valve 112 will be selectively movable between a first position which allows wax flow between the wax inlet and the wax outlet of the dispenser block 108 and a second position blocking the wax flow between the wax inlet and the wax outlet of the dispenser block 108. The dispenser block 108 is positioned over a saw blade 114 so as to properly dispense solid or semisolid lubricant into the gullets of each of the blades of saw 114.

Figure 3:
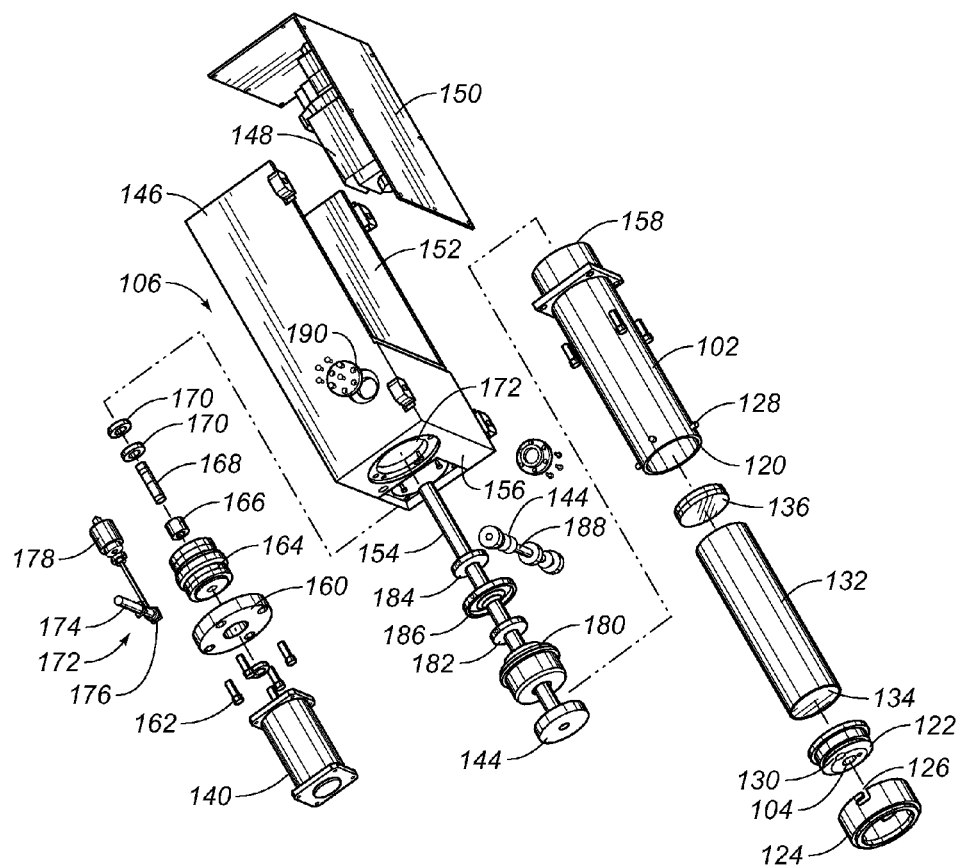
FIG. 3 is an exploded view showing the wax delivery system as used in the saw blade lubricating apparatus of the present invention.

FIG. 3 is a detailed view showing the drive means 106, and the barrel 102. Specifically, it can be seen in FIG. 3 that the barrel 102 is a tubular member having an open end 120. A fitting 122 has outlet 104 formed therein. Fitting 122, along with outlet 104, is secured within the open end 120 of the barrel 102 through the use of a quick disconnect coupling 124. Quick disconnect coupling 124 includes a slot 126 that can engage pins 128 located on the exterior of barrel 102. As a result, both the fitting 122 and the coupling 124 can be quickly and easily secured onto the open end 120 of the barrel 102. A suitable bleed valve 130 can be provided on the fitting 122 so as to allow air to be purged manually therethrough.

In FIG. 3, there is shown a tube 132. Tube 132 is a plastic tube that is suitably deformable. A wax stick 134 is contained within the interior of the tube 132. A piston 136 is located at the upper end of the tube 132. So as to facilitate the easy operation of the saw blade lubricating apparatus of the present invention, each wax stick 134 is delivered with tube 132 extending therearound and piston 136 fitted at the end thereof. As a result, the tube 132, along with included wax 134, is simply inserted into the open end 120 of the barrel 102. During the process of extruding the wax 134 outwardly of the outlet 104, the piston associated with the drive means 106 will bear upon the piston 136 within tube 132. This will cause the outer periphery of the plastic tube 132 to deform outwardly and to bear against the inner walls of the barrel 102 as the wax 134 is dispensed therefrom. As a result, the present invention avoids the possibility of leakage around the periphery of the piston associated with the drive means 106. The expansion of the outer periphery of the tube 132 against the inner wall barrel 102 assures a tight seal which prevents wax from accidentally leaking outwardly in various other direction other than through the outlet 104. After the wax 134 has been dispensed from tube 132, the tube 132, and the piston 136, can be disposed of in a conventional manner.

The drive means 106 includes a motor 140, a gear box 142 and a piston 144. The motor 140 and the gear box 142 are positioned within a housing 146. An electrical panel 148 is secured to cover 150 which is fitted upon the opening 152 of housing 146. A rod 154 extends outwardly of the end 156 of the housing 146. In use, the piston 144 will be fitted into the end 158 of the barrel 102 so as to provide a force upon the piston 136 within tube 132.

The motor 140 is ideally a one-quarter horsepower motor. The motor 140 is secured to a motor mount plate 160 through the use of bolts 162. The planetary gear set 164 is placed upon the shaft of the motor 140. Various items such as helical gear 166, planetary shaft 168 and bearing 170 are also interconnected to the shaft of motor 140. The motor 140 and its associated components will fit into the opening 172 at the bottom of the housing 146. So as to allow for the reversal of the movement of piston 144, a planetary stop shaft 174 is joined to a planetary stop 176 which is interconnected to a solenoid 178. The operation of the solenoid 178 will change the ratio of the gear box. The solenoid 178 provides a gear shift for the operation of the drive means 106 of the present invention.

The piston 144 is mounted on an acme screw which forms rod 154. A bearing cap 180 is mounted on the rod 154 adjacent to the piston 144. A pair of bearings 182 and 184 are mounted on opposite sides of the worm gear 186. A cross shaft 188, in the form of a worm shaft, engages the worm gear 186 and extends transversely in the housing 146. A bearing cover and associated bearings 190 serve to rotatably support the shaft 188 in transverse relationship across the worm gear 186. The helical gears 194 will engage the helical gear associated with the motor 140. As such, the operation of the motor 140, through the sun-and-planetary gear arrangement 164, will cause the rotation of the shaft 188 and the helical gear 194 so as to properly rotate the rod 154 so as to cause a downward movement of the piston 144 within the barrel 102. A shifting caused by the operation of solenoid 178 can change the ratio of the gear box. Ideally, within the concept of the present invention, the reverse action of the piston 144 should be suitable so as to cause 0-12 inches of movement within two minutes. The drive means 106 of the present invention offers an 80,000:1 reduction.

Figure 4:
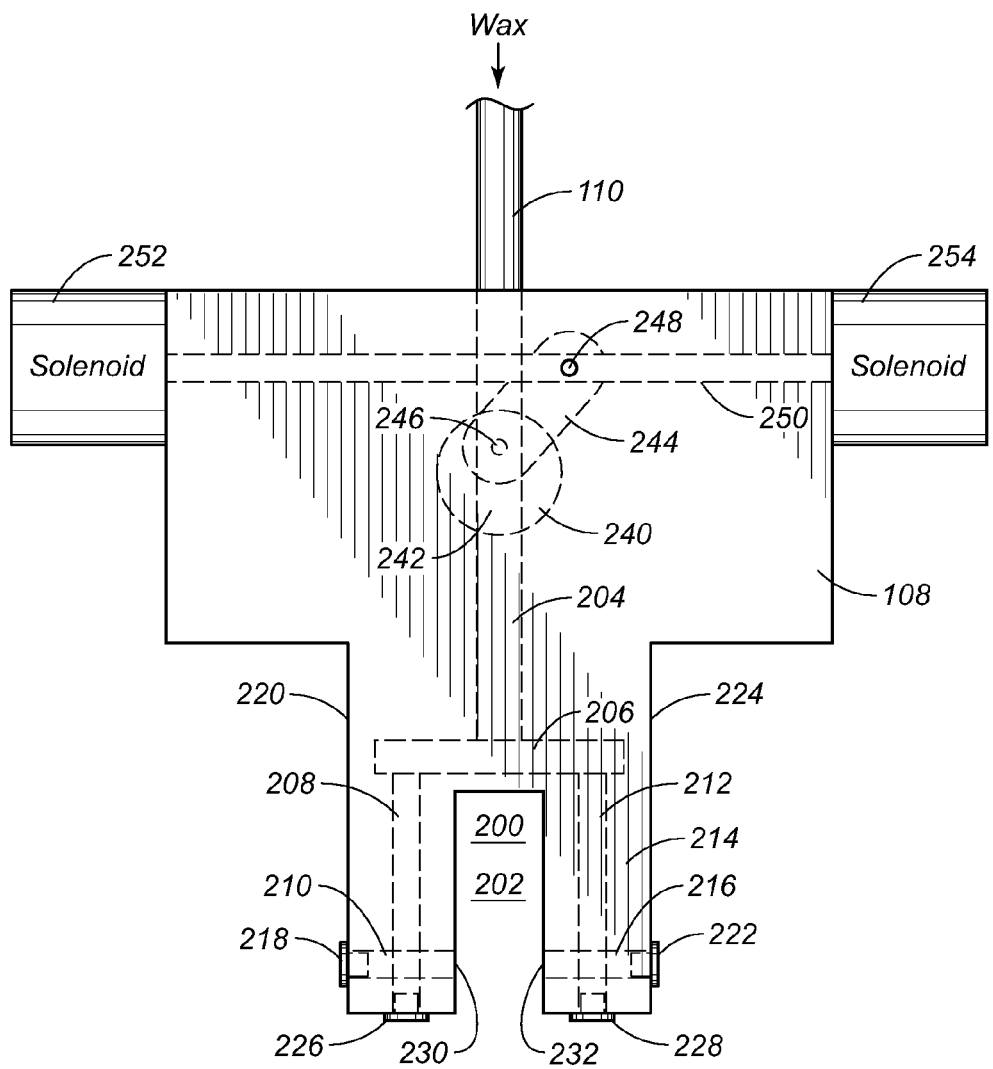
FIG. 4 is a diagrammatic illustration showing the dispenser block and valves as used in the wax delivery apparatus of the saw blade lubricating apparatus of the present invention.

FIG. 4 illustrates the details of the dispenser block 108. The dispenser block 108 is formed of a machined steel block. A forked area 200 is provided at a lower end thereof. As such, the slot 202 within forked area 200 can be suitably positioned so as to extends on opposite sides of a saw blade. A channel 204 is machined within an interior of block 108. Channel 204 will connect with the conduit 110 so as to allow wax to pass therethrough. The channel 204 communicates with a manifold 206 located within the interior of the block 108. A wax delivery channel 208 communicates with the manifold 206 so as to deliver wax to the first wax outlet 210. Similarly, a wax delivery channel 212 extends through another fork member 214 at the end of block 108 so as to communicate with the second wax outlet 216. A cap 218 is secured over an end of the first wax delivery outlet 210 on surface 220 of block 108. Similarly, another cap 222 is secured over the end of the wax delivery outlet 216 on surface 224 of block 108. Caps 226 and 228 are fitted, respectively, at the open ends of the wax delivery channels 208 and 212. The positioning of caps 218, 222, 226 and 228 assures that the flow of wax on the interior of block 108 is directed toward the outlets 230 and 232 formed on the inner surface of the forked area 200.

In FIG. 4, it can be seen that a valve 240 is placed onto the channel 204 either within the block 108 or exterior of the block 108. In FIG. 4, the valve 240 is illustrated as being interior of the block. Valve 240 includes an interior passageway 242 which allows the wax passing through the conduit 110 to be passed along channel 204 to the manifold 206. A crank arm 244 is secured to a shaft 246 extending from valve 240. Crank arm 244 serves to move the valve 240 from a first position, as illustrated in FIG. 4, in which wax can flow through the channel 204 from the conduit 110 toward the outlets 230 and 232 to a second position in which wax flow is blocked from passing through the channel 204.

Figure 1:
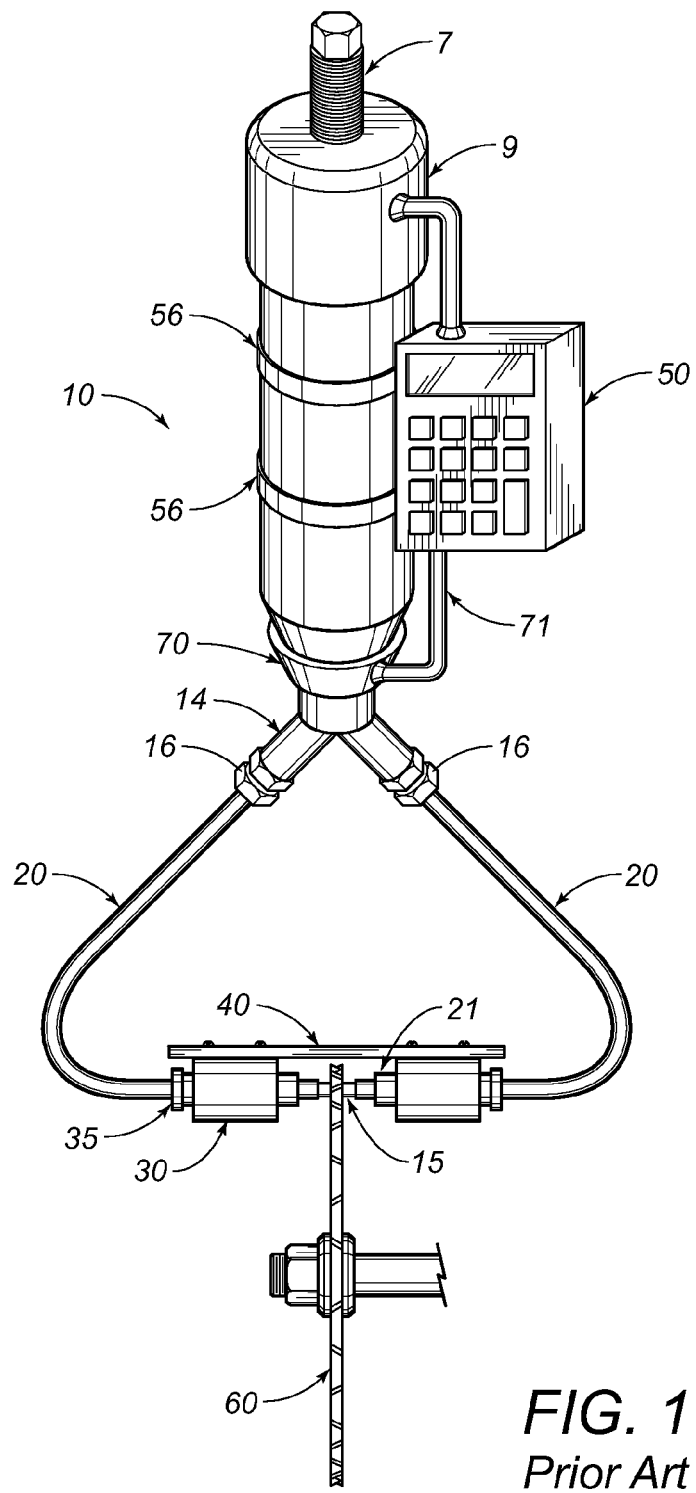
FIG. 1 is a diagrammatic illustration of a prior art saw blade lubricating apparatus.

The crank arm 244 is connected by a pin 248 to a shaft 250 extending from a first solenoid 252 and a second solenoid 254. The operation of the solenoids 252 and 254 will serve to move the valve 240 from the first position (as illustrated in FIG. 4) to a second position in which the passageway 242 thereof is out of alignment with the channel 204 and wax flow is blocked. Importantly, with the use of the solenoids, the direction of strong movement generally occurs in only one direction. The reverse action of a solenoid is only imparted by the retraction of a spring. So as to assure strong movement of the crank arm 244, a pair of solenoids 252 and 254 are employed with the present invention. As such, one of the solenoids will impart a "pushing" action while the other solenoid will be simultaneously causing a "pulling" action, in one direction or the other. As a result, a controlled movement of the crank arm 244, and the associated valve 240, between the first and second positions is fully assured. Solenoids 252 and 254 can be powered by direct current and controlled by a control box similar to that described in the prior art associated with FIG. 1 herein.

Since the dispenser block 108 is a machined steel block, it strongly retains the pressurized wax therein. The present invention avoids the need for Y-tubing and associated fittings. Additionally, the operation of the solenoids 252 and 254, along with valve 240, allows for a time delay operation before the wax extrusion process begins at the barrel 102. When the pusher piston associated with barrel 102 is turned off, the valve 240 can be rotated to its second position. The ball valve 240 can then be rotated to its first position and a time delay can be imparted before the pusher piston associated with barrel 102 is activated. As a result, the present invention is able to utilize the residual energy at the outlets 230 and 232.

Figure 5:
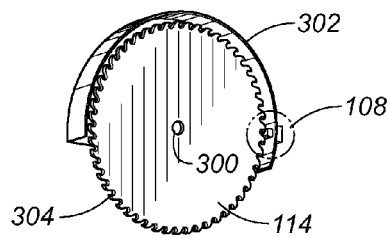
FIG. 5 is a perspective view showing the wax delivery system as used with a saw blade.
Figure 6:
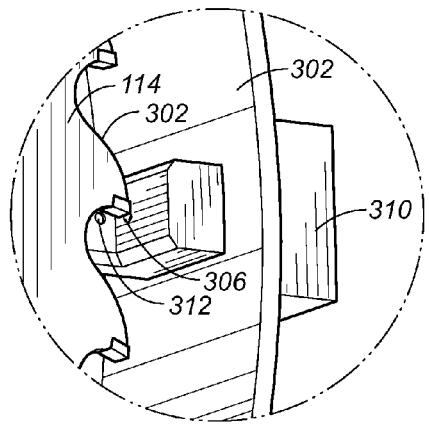
FIG. 6 is detailed view showing the circled area of FIG. 5.

FIG. 5 shows an illustration of the dispenser block 108 as used with a saw blade 114. Saw blade 114 is a planar blade that rotates about central axis 300. A blade guard 302 extends around the periphery of blade 114. The dispenser block 108 is positioned in close proximity to the teeth 304 of blade 114. FIG. 6 shows a detailed illustration of how the wax can be dispensed onto the teeth 304 of blade 114. As can be seen, the wax outlet 306 extends from block 308 in close proximity to the teeth 304. The dispenser block 310 is positioned on the outer side of the blade guard 302 from the block portion 308. As wax oozes through the outlet 306 and/or the outlet 312, the rotating blade 114 will contact the wax so that the wax imparted properly into the gullets of the saw blade 114.

Figure 7:
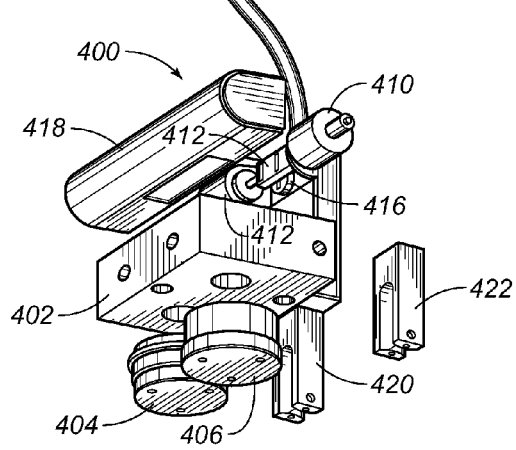
FIG. 7 is a perspective view showing the wax delivery system as applied for the purposes of lubricating a band saw.

FIG. 7 shows the application of the present invention in association delivery mechanism 400 associated with a band saw. In FIG. 7, the dispenser block 402 is mounted to the underneath surface of the band saw roller guide support block 401 which has standard blade rollers 404 and 406 extending therefrom. The conduit 408 will extend so as to communicate with the channels within the dispenser block 402. Solenoids 410 and 412 will operate in concert so as to properly operate the crank arm 414 associated with the valve 416. A solenoid cover 418 is illustrated as separated from the solenoids 410 and 412. In actual operation, the cover 418 will reside over the solenoids 410 and 412. Ultimately, the applicator 420 will be positioned over one portion of the band saw. A different style applicator 422 can be positioned similarly.

Figure 8:
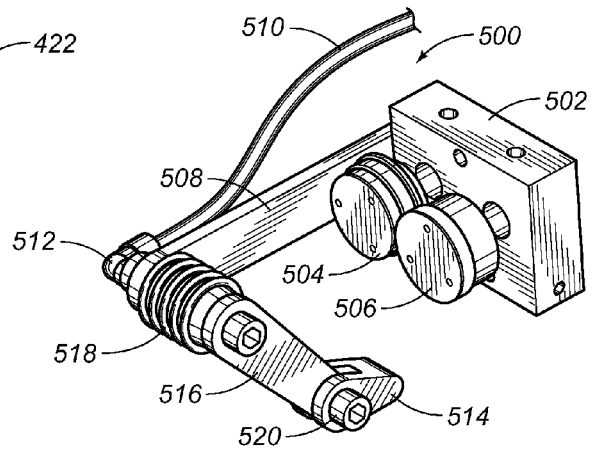
FIG. 8 is a perspective view showing the application of the wax delivery system to a saw blade as used for cutting a slab.

FIG. 8 shows the wax delivery system 500 in association with a slab saw system. In slab saw system, the saw will cut through a slab. As such, it is desirable to place a ribbon of wax onto the slab forward of the saw blade. In FIG. 8, it can be seen that the guide roller 502 has blade rollers 504 and 506 thereon. A pivot arm bracket 508 extends outwardly from the guide roller 502. Conduit 510 is connected to an elbow 512 associated with the applicator 514. In FIG. 8, it can be seen that the applicator 514 is positioned forward of the guide roller block 502. Applicator 514 is designed so as to dispense the wax directly onto the surface of the slab forward of the saw blade. A pivot arm 516 is interconnected to the elbow 512 through the use of pivot arm spring 518. A suitable screw 520 secures the applicator 514 to the pivot arm 516. As such, the wax is passed through the conduit 510, through the elbow 512, into the pivot arm 516 and into the applicator 514. The spring 518 allows the applicator 514 to travel in a resilient manner upon the top surface of a slab.

The present invention achieves several improvements over that of U.S. Pat. No. 5,839,335. In the present invention, through the use of the dispenser block and the through the steel material of the main barrel, it is possible to run at much higher pressures in the extrusion process. The present invention avoids the use of hoses. The conduits extending from the barrel in the present invention are actual steel tubing and not flexible hoses.

The present invention allows a minimum of 0-12 inches of movement within a reasonable time. As such, during the retraction of the piston within the barrel, it is possible to achieve two inches per minute of movement. The total drive package is established through an 80,000:1 reduction gear box. The present invention utilizes electric solenoid-control ball valves on the dispenser block where the wax lubricant is to be dispensed into the gullets of the blade. The present invention avoids the need for Y-adapters and also avoids the need for heaters. However, within the concept of the present invention, it is possible to utilize heaters, if required. The present invention utilizes a quick disconnect coupling so that the wax container can be quickly and easily changed. The operation of the present invention can be carried out with a programmable logic control having an operator interface.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A saw blade lubricating apparatus comprising:
   a barrel having an outlet at one end thereof;
   a drive means cooperative with said barrel;
   a dispenser block interconnected to said barrel, said dispenser block having a wax inlet and a wax outlet;
   a valve positioned in or on said dispenser block, said valve selectively movable between a first position allowing wax flow between said wax inlet and said wax outlet and a second position blocking wax flow between said wax inlet and said wax outlet;
   a wax stick received within said barrel, said drive means acting on said wax stick so as to extrude the wax from said wax stick outwardly of said outlet of said barrel;
   a tube having said wax stick therein, said tube having an outer diameter less than an inner diameter of said barrel; and
   a piston positioned at one end of said tube, said drive means acting on said piston for extruding the wax outwardly of said outlet.

2. The apparatus of claim 1, said barrel having said outlet extending through a fitting applied to said one end of said barrel, said fitting releasably retained by a quick disconnect coupling at said one end.

3. The apparatus of claim 1, said drive means having a piston extending into said barrel, said drive means for forcibly pushing said piston through an interior of said barrel.

4. The apparatus of claim 3, said drive means comprising:
   a motor positioned adjacent said barrel; and
   a gear box drivingly connected to said piston, said motor drivingly connected to said gear box.

5. The apparatus of claim 1, further comprising:
   a conduit affixed at one end to said outlet of said barrel and connected at an opposite end to said dispenser block.

6. A saw blade lubricating apparatus comprising:
   a barrel having an outlet at one end thereof;
   a drive means cooperative with said barrel for extruding wax outwardly of said outlet of said barrel;
   a dispenser block interconnected to said barrel, said dispenser block having a wax inlet and a wax outlet;
   a valve positioned in or on said dispenser block, said valve selectively movable between a first position allowing wax flow between said wax inlet and said wax outlet and second position blocking wax flow between said wax inlet and said wax outlet, said dispenser block having a channel extending therein, said wax outlet comprising a first wax outlet in communication with said channel and a second wax outlet in communication with said channel, said first wax outlet facing said second wax outlet in spaced relationship thereto, said valve being positioned in said channel, said valve having a crank arm extending therefrom; and
   a first solenoid connected to said crank arm so as to selectively move said valve between said first and second positions.

7. The apparatus of claim 6, further comprising:
   a second solenoid connected on an opposite side of said crank arm from said first solenoid, one of said first and second solenoids for moving said crank arm in one direction, the other of said first and second solenoids for moving said crank arm in an opposite direction.

8. A saw blade lubricating apparatus comprising:
a barrel having an outlet at one end thereof;
a drive means cooperative with said barrel for extruding wax outwardly of said outlet of said barrel;
a dispenser block interconnected to said barrel, said dispenser block having a wax inlet and a wax outlet;
a valve positioned in or on said dispenser block, said valve selectively movable between a first position allowing wax flow between said wax inlet and said wax outlet and second position blocking wax flow between said wax inlet and said wax outlet, said dispenser block having a channel extending therein, said wax outlet comprising a first wax outlet in communication with said channel and a second wax outlet in communication with said channel, said first wax outlet facing said second wax outlet in spaced relationship thereto, said dispenser block having a manifold area connected to said channel, said manifold area being in communication with each of said first and second wax outlets.

* * * * *